United States Patent [19]

Yoshida et al.

[11] 4,412,225

[45] Oct. 25, 1983

[54] METHOD FOR COLOR REPRESENTATION USING COLORED INK DOTS

[75] Inventors: Kazutaka Yoshida; Hideo Horiuchi, both of Minami-ashigara, Japan

[73] Assignee: Fuji Photo Film Co., Ltd., Kanagawa, Japan

[21] Appl. No.: 346,908

[22] Filed: Feb. 8, 1982

[30] Foreign Application Priority Data

Feb. 6, 1981 [JP] Japan ................................ 56-15655

[51] Int. Cl.³ .............................................. G01D 15/18
[52] U.S. Cl. ........................................ 346/1.1; 346/75; 358/75
[58] Field of Search ................. 346/75, 140, 1.1, 46; 358/75, 78, 296, 298

[56] References Cited

U.S. PATENT DOCUMENTS

| | | | |
|---|---|---|---|
| 3,553,371 | 1/1971 | Suenaga | 358/77 |
| 3,564,120 | 2/1971 | Taylor | 346/75 X |
| 3,977,007 | 8/1976 | Berry et al. | 346/1.1 |
| 4,320,406 | 3/1982 | Heinzl | 346/140 R X |

OTHER PUBLICATIONS

Japanese Open Patent Gazette No. 54-126416 and the English Translation thereof.
Siemens Review Magazine, pp. 235-241; "Sicograph Output Terminal for Colour Print-Outs".
A 3-Colour Ink Jet Plotter for Computer Graphics; BIT 13, (1973), 181-195; Boris Smeds.

*Primary Examiner*—Joseph W. Hartary
*Attorney, Agent, or Firm*—Young & Thompson

[57] ABSTRACT

A method for representing a complex color by providing a mean-value a color mixture of low and middle color density so as to deposit at least two kinds of different color ink drops on a dot matrix in such a way as to permit a single ink drop to be in each of the greater part of the cells of the dot matrix. But a subtractive color mixture is used at high color density so as to deposit at least two kinds of different color ink drops on a dot matrix in such a way as to permit at least two kinds of ink drops to be superimposed in each of the greater part of the cells of the dot matrix. With a dot matrix of rectangular configuration of columns and rows of cells, each color is applied starting from a different corner of the matrix and progressing toward the diagonally opposite corner as the required level of color density progressively rises.

8 Claims, 12 Drawing Figures

METHOD FOR COLOR REPRESENTATION USING COLORED INK DOTS

BACKGROUND OF THE INVENTION

The present invention relates to a method for representing complex colors by ink dot-patterns and more particularly to a method for producing, by using an ink-jet color printer, color images with complex colors such as a color photograph.

In ink-jet color printers in general use, a plurality of colored inks, for instance at least cyan, magenta and yellow, are ejected to paint a color image in the form of an ink dot-pattern. These ink-jet color printers have used a method in which an image with half-tones is represented by controlling the quantity of ink drops to be deposited on dot matrices provided one for each of the picture elements on a recording paper, and an image with complex colors is represented by mixing different colors of ink drops.

In a method for representing complex colors, for instance as disclosed in Japanese patent unexamined publication No. 54-126416, or our U.S. Ser. No. 317,850, filed Nov. 3, 1981 and entitled "Ink-Jet Color Printing Apparatus", ink-jet heads provided one for each color of ink and arranged along a scanning direction deposit ink drops of different colors on a single scanning line (that is, a picture element line) so as to superimpose individual color inks on the given image point at the correct time. This is effected with the aid of digital timer timers that delay the picture signals that act on one head by a time interval corresponding to the distance between that one head and the preceding head. The method described above, wherein a plurality of ink drops having different colors are laid all in one spot, can be considered as a kind of subtractive color mixture. However, in this kind of subtractive color mixture, it is hardly possible to represent vivid complex colors because of the resulting turbid mixture of ink drops having different colors.

For representing vivid complex colors without the ink drops being turbidly mixed, it is desirable to deposit several colors of ink drops in side-by-side arrangement in a dot matrix in such manner that no ink drop overlaps an ink drop previously deposited. This side-by-side arrangement of ink drops is quite similar to an additive color mixture in effect and hence can be classified as a kind of additive color mixture technique. In an actual ink-jet printer using several different colors of ink, although the superimposition of different color ink drops unavoidably occurs in a plurality of cells, the number of cells in which different color ink drops are deposited to overlap one another or the amount of ink in these cells is less than that of the remaining cells in which a single ink drop is deposited, so that a method using the side-by-side arrangement of ink drops in a dot matrix as aforementioned can produce an effect quite similar to that of an additive color mixture. Therefore a method using a side-by-side arrangement of ink dots constituted only by a plurality of single ink dots or including a small number of ink dots comprising different color ink drops is hereinafter called providing a mean-value color mixture. However, in such a method of providing a mean-value color mixture there is the disadvantage that, when representing complex colors of high density levels, a group of ink dots forming a single picture element are liable to change the appearance of the color.

Various techniques for producing half-tones used with an ink-jet color printer have been developed, wherein it has been proposed, as in U.S. Pat. No. 3,977,077, to vary the number of ink dots in a dot matrix and to provide a pattern of arrangement in the dot matrix having m possible positions in the row and n possible positions in the column, that is, $m \times n$ cells (m and n being integers) for one picture element so as to paint images with half-tones in a sufficiently large number of steps of gradation, for instance in at least 16 steps of gradation. A method of this kind, however, has the disadvantage that delicate differences in half-tones are hardly expressible with only a restricted number of steps of gradation, and an increase in the number of steps unavoidably requires the provision of a large number of cells of a dot matrix for one picture element.

OBJECTS OF THE INVENTION

The principal object of the present invention is to provide a novel method for representing complex colors without visible variegation.

Another object of the present invention is to provide a novel method for representing complex colors without visible turbidity.

Still another object of the present invention is to provide a novel method for representing complex colors with delicate half-tones without changing the appearance of the color at even a high density level.

SUMMARY OF THE INVENTION

Color mixtures wherein a plurality of ink dots of three primary colors are deposited in side-by-side arrangement and intentionally dispersed in a dot matrix for a picture element, at low or middle density, are suitable for painting vivid images such as scenes with autumnal tints. Moreover, it is evident from examining experimental results that a picture element of a complex color is, at low or middle density, produced without changing the appearance of the color.

Therefore, in the present invention, we aim to produce picture elements with complex colors of high density in a subtractive color mixture and to produce picture elements with complex colors of low or middle density by providing a mean-value color mixture similar to an additive color mixture. An ink dot matrix produced by arranging a color mixture includes a few cells each of which has different color ink dots superimposed. Specifically, the number of cells having at least two different color ink dots superimposed does not exceed three in a single dot matrix in the case of a $3 \times 3$ dot matrix. When the number of said cells in a single dot matrix is more than three, it is classified as a subtractive color mixture.

BRIEF DESCRIPTION OF THE DRAWING

Other objects, advantages and features of novelty of the invention will be evident to those skilled in the art from a reading of the following specification in conjunction with the accompanying drawings. These drawings show, for illustrative purposes only, preferred embodiments of the invention.

In the drawings

FIGS. 7A and 7B are illustrations of dot matrix tables;

DETAILED DESCRIPTION OF THE INVENTION

Figure 1:
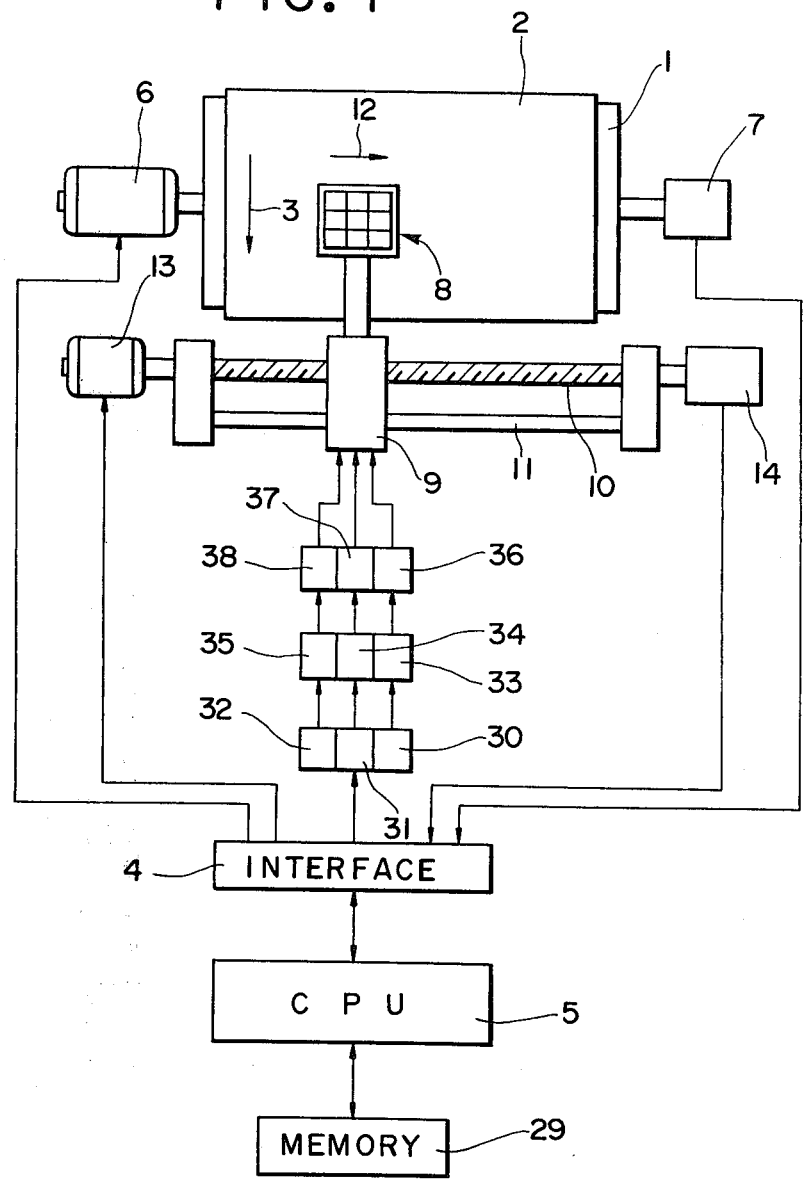
FIG. 1 is a schematic illustration of an ink-jet color printer for practicing the present invention.

Referring now in detail to the drawings, wherein like reference numerals denote the same or similar elements throughout the several views, in a preferred apparatus for carrying out the method of the invention illustrated in FIG. 1, a rotary drum 1 around which a recording paper (plain paper) 2 is wrapped is caused to rotate in the primary scanning direction as shown by the arrow 3 by means of a main pulse motor 6 to which driving pulse signals are fed from a central processing unit (CPU) 5 through an interface 4. The actual position of the rotary drum 1 undergoing rotation is, in the primary scanning direction, detected by a main rotary encoder 7 adapted to reset the contents thereof every one revolution of the rotary drum 1.

Provided along and close to the outer surface of the rotary drum 1 is a head assembly 8 firmly attached to a movable table 9 which is caused to advance in the secondary scanning direction as shown by the arrow 12 by means of a feed screw shaft 10 and a guide rod 11. The feed screw shaft 10 is rotated by means of a second pulse motor 13 which is adapted to rotate by one step every one revolution of the rotary drum 1 so as to advance the head assembly 8 in the secondary scanning direction. Consequently the actual position of the head assembly 8 relative to the recording paper 2 can be indicated by the main and second rotary encoders 7 and 14.

Figure 2:
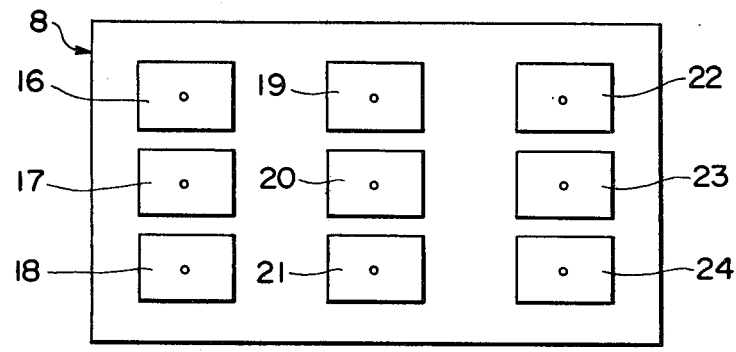
FIG. 2 is a schematic front view of a head assembly which is used with the ink-jet printer of FIG. 1.

The head assembly 8 is, as shown in FIG. 2, comprised of three groups of ink-jet heads for cyan, magenta and yellow, each of which has three ink-jet heads arranged, in side-by-side relation, with mutual separation by a suitable distance in the primary scanning direction. The respective ink-jet heads 16 to 24 are provided each with a nozzle at its center for ejecting ink drops therefrom. Thus the head assembly 8 ejects simultaneously nine ink dots from nine ink-jet heads comprising three for every color.

In a dot matrix having m possible positions in the column and n possible positions in the row, in the case of m=4, it suffices to provide a group of ink-jet heads with four ink-jet heads for the respective colors in the primary scanning direction. Furthermore, since n will depend on the number of ink drops ejected from one ink-jet head, this can be done electrically and so irrespective of the number of ink-jet heads. In the case of using black ink or special colored inks such as the color of the skin, another group of ink-jet heads will be additionally provided in the same way as described above.

Figure 3:
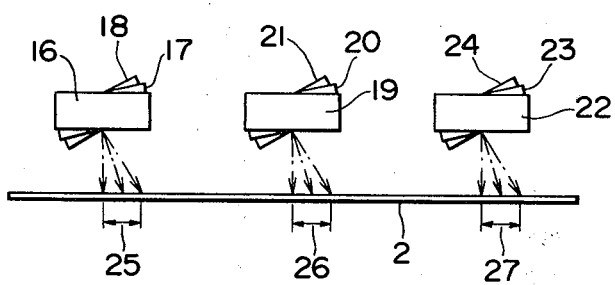
FIG. 3 is a schematic view showing a head assembly of FIG. 2 in a recording stage.

As shown in FIG. 3, three ink-jet heads 16 to 18 for cyan are arranged at different angles so as to eject ink drops at positions shifted from each other by increments of distance equal to the size of a dot in the secondary scanning direction. In the embodiment shown, the first ink-jet head 16 is disposed parallel to the surface of the recording paper 2 and the other two ink-jet heads 17 and 18 are tilted at an angle to each other. Therefore, dot matrices corresponding to picture elements on the scanning line 25 extending in the plane which is perpendicular to the plane of the drawing are filled with ink dots by ink-jet heads 16 to 18 due to the recording paper 2 running in a direction perpendicular to the plane of the drawing.

Figure 4:
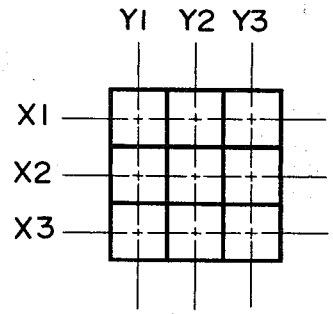
FIG. 4 is an illustration of a dot matrix.

That is to say, in the case of forming a picture element by the use of a dot matrix having three possible positions (which can be thought of as cells) on each of the rows and the columns as shown in FIG. 4, three cells (Y1X1, Y1X2, Y1X3) on the Y1 axis in the primary scanning direction are painted with ink dots in sequence by the ink-jet head 16, and other cells on the Y2 and Y3 axes are painted by the ink-jet heads 17 and 18, respectively, in the same manner as described for the cells on the Y1 axis. It is to be noted that the grid shown in FIG. 4 indicates the positions in which ink drops are deposited.

As the ink-jet head 17 is disposed in such a way that its nozzle is spaced from the nozzle of the ink-jet head 16 in the primary scanning direction by a suitable distance, the signal for driving the ink-jet 17 is delayed as compared with the signal for the ink-jet head 16 by the amount of time corresponding to that necessary for the former to deposit ink drops over the said distance. The relationship between the ink-jet heads 16 and 18 is much the same as for the ink-jet head 17. Therefore ink drops of the same color are accurately positioned in the respective cells. In the same manner as described for cyan, the ink-jet heads 19 to 21 for magenta form ink dot matrices of picture elements on the scanning line 26; the ink-jet heads 22 to 24 for yellow form ink dot matrices on the scanning line 27.

Now, the ink-jet heads 16, 19 and 22 form ink dot matrices of picture elements on the same secondary scanning line, the ink-jet heads 17, 20 and 23 form ink dot matrices on the same secondary scanning line different from the secondary scanning line described just above, and the ink-jet heads 18, 21 and 24 form ink dot matrices on the same secondary scanning line; but this last line is different from the other two scanning lines. As a result, the ink-jet heads 16 to 24 deposit ink drops simultaneously in nine matrix cells which are allocated to three picture elements and hence distributed to each of three scanning lines by three cells.

As is apparent from the description hereinbefore, since the head assembly 8 having three groups of ink-jet heads 16 to 18, 19 to 21 and 22 to 24 moves to the left by a width of a single scanning line in which three dots will be deposited each revolution of the rotary drum 1, the ink-jet heads 19 to 21 eject magenta ink drops to deposit magenta ink dots on a dot matrix where cyan ink dots were deposited when the ink-jet heads 19 to 21 were positioned on the scanning line 25. In the same way as described for magenta, the ink-jet heads 22 to 24 deposit yellow ink dots on a dot matrix on the scanning line 25. Thus one matrix for one picture element having three cells on each of the rows and columns existing on the scanning line 25 receives a deposit of up to three kinds of colored ink dots.

Figure 5:
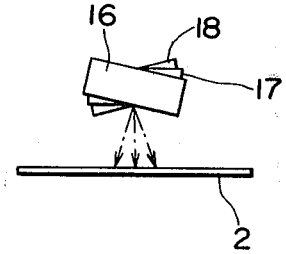
FIG. 5 is a schematic view of another arrangement of a group of ink-jet heads.

FIG. 5 illustrates another arrangement of a group of ink-jet heads 16 to 18, wherein ink-jet heads 16 and 18 are tilted at an angle in different direction to the ink-jet head 17, which last is parallel to the recording paper.

Referring again to FIG. 1 for describing an ink-jet color printer in detail, color density signals of the three primary colors, namely, blue, green and red for each picture element memorized in a memory 29 are addressed to be read in connection with position signals from the second rotary encoder 14 so as to be masked and converted into color density signals of three subtractive colors, namely, cyan, magenta and yellow. Since three groups of ink-jet heads are arranged so as to eject ink drops toward the recording paper 2 to paint simultaneously three scanning lines with different colors, color density signals memorized in the memory 29 should be extracted in sequence corresponding to the respective scanning line. A line buffer memory 30 memorizes temporarily color density signals of cyan only, extracted for each picture element on the scanning line which is to be painted by the ink-jet heads 16 to 18 for cyan. A line buffer memory 31 for magenta memorizes temporarily color density signals of magenta, extracted for each picture element on the scanning line 26 which is to be painted by the ink-jet heads 19 to 21. In the same manner a line buffer memory 32 for yellow memorizes temporarily color density signals of yellow, extracted for each picture element on the scanning line 27 which is to be painted by the ink-jet heads 22 to 24.

The color density signals for a single scanning line memorized in the respective line buffer memory 30 to 32 are fed to a respective dot-pattern generator 33 to 35 in order to determine, corresponding to the density in levels, the number, the size and the position of dots to be deposited on the dot matrices. The dot signals from the dot-pattern generators 33 to 35 are fed to head driving devices 36 to 38, respectively, causing the respective ink-jet heads 16 to 24 to drive so as to paint simultaneously the scanning lines 25 to 27.

Figure 6:
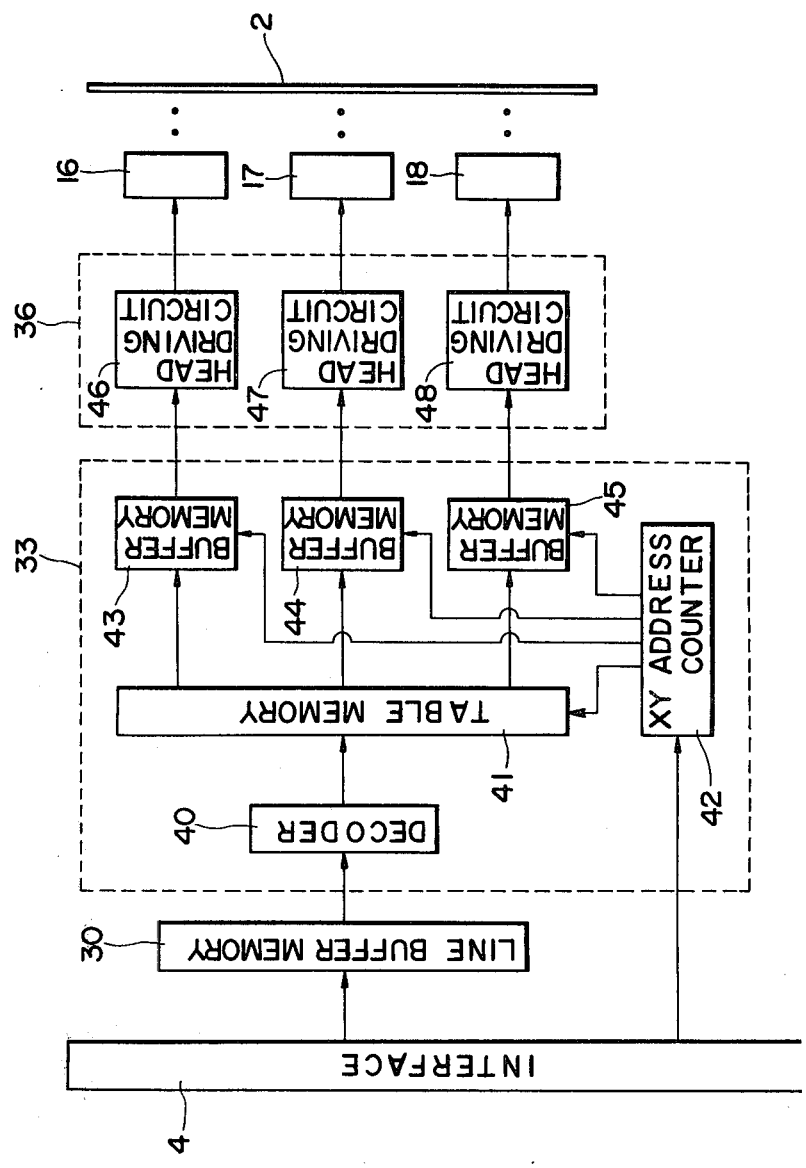
FIG. 6 is a block diagram showing a control circuit for driving a group of ink-jet heads.

FIG. 6 is a block diagram of an electric circuit for controlling the driving of three ink-jet heads for cyan. Cyan color density signals for each picture element on a scanning line, for instance the line 25, memorized temporarily in the line buffer memory 30 are decoded by a decoder 40 to address a table in a table memory 41 wherein dot patterns to be formed according to levels of the color density have been previously memorized in the form of combinations of positions of matrix cell and dot signals (that is, coded signals corresponding to the voltage for driving an ink-jet head). The reading out of dot signals of matrix cells Y1X1, Y1X2 and Y1X3 (shown in FIG. 4) is performed by addressing, first, the Y1 line and then counting up, in sequence, for each address on the X line with an XY address counter 42. Dot signals of the Y1 line read out are memorized in a buffer memory 43 addressed by the XY address counter 42. Dot signals of the Y2 and Y3 line are memorized in respective buffer memories 44 and 45 in the same manner as described for the Y1 line.

It should be noted that dot signals of the same X line are memorized in different addresses because the leading addresses in the buffer memories 43 to 45 are shifted by the number of dots corresponding to the different displacements of the ink-jet heads 17 and 18 relative to the ink-jet head 16. The respective buffer memories 43 to 45 are addressed by the position signals from the main rotary encoder 7 so that dot signals for one scanning line are, in sequence, read out therefrom. Further dot signals memorized in buffer memories 44 and 45 are read out with a delay time corresponding to the time which is required to produce a predetermined number of dots because the leading addresses of the buffer memories 44 and 45 are different from the buffer memory 43. It is to be noted that digital delaying circuits can be provided in order to delay dot signals read out from the buffer memories. Dot signals of the Y axis (Y1, Y2 and Y3) converted into analog signals in head driving circuits 46 to 48 and biassed are fed to the respective ink-jet heads 16 to 18. Thus the respective ink-jet heads 16 to 18 are simultaneously driven to deposit ink drops on the recording paper 2.

Figure 7A:
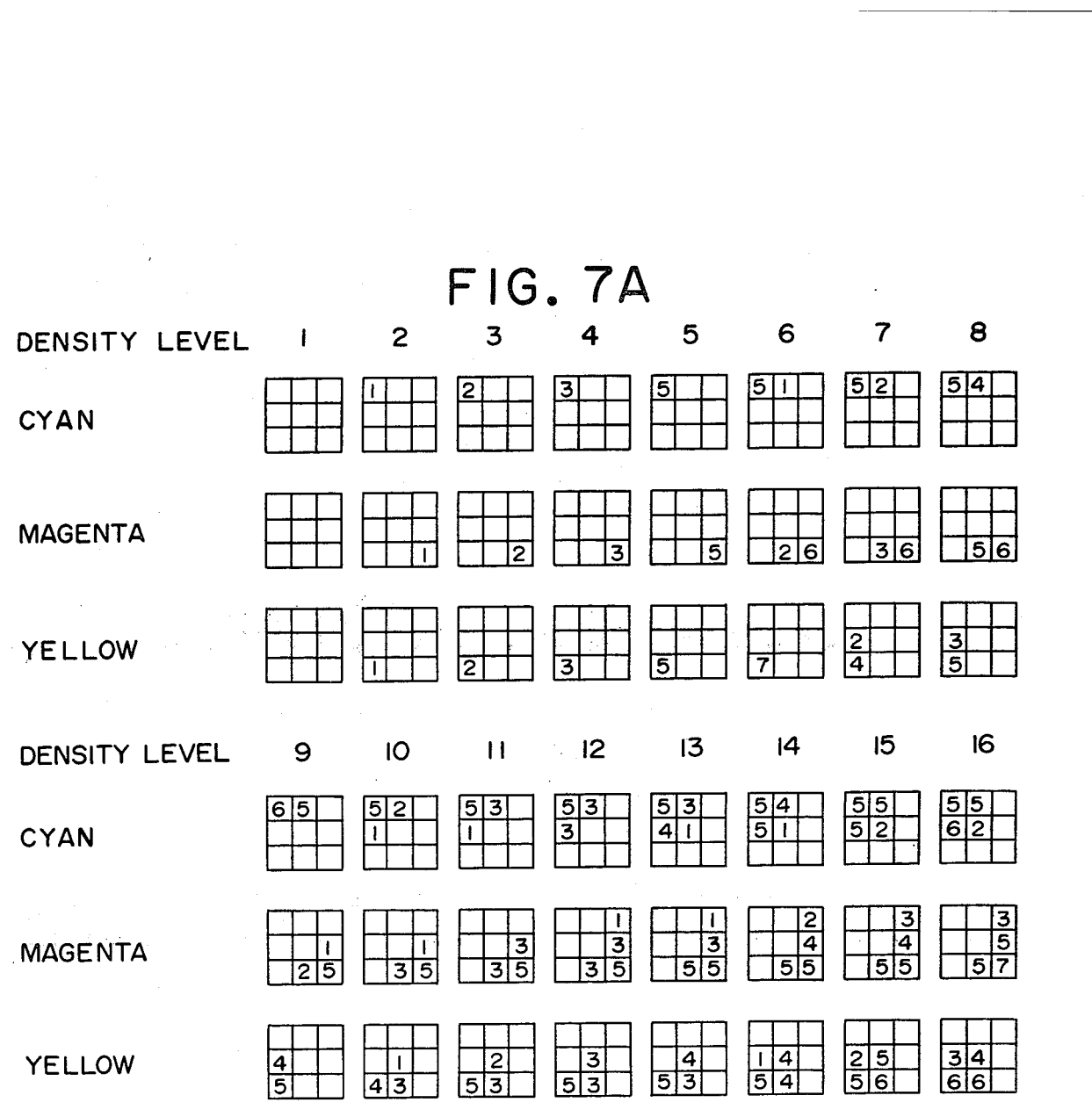
Figure 7B:
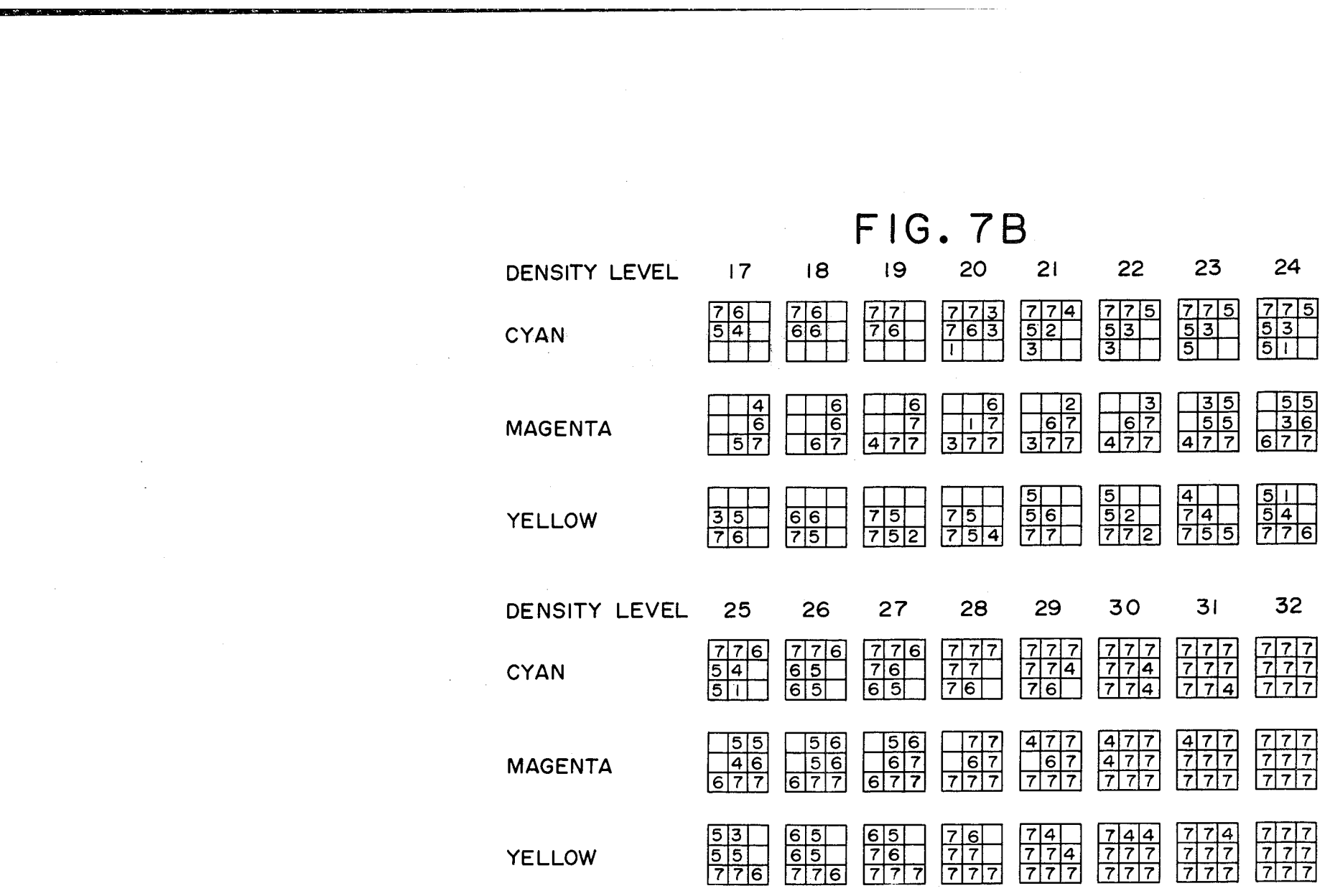

FIGS. 7A and 7B show, for illustrative purposes only, dot matrix tables for each color memorized in table memories, wherein the same reference numerals indicated in matrix cells denote the same levels of voltage, for instance in this embodiment which is divided into seven steps of levels, to be applied to ink-jet heads. It is supposed that an ink-jet head is caused to eject a large ink drop so as to deposit a large size of ink dot on a recording paper in response to an application of a voltage of level "7", which means the highest voltage, and that an ink-jet head is caused to eject a small ink drop so as to deposit a small size of ink dot on a recording paper in response to an application of a voltage of level "1", which means the lowest voltage. The levels of voltage to be applied to an ink-jet head and/or sizes of ink dot do not necessarily obey a linear function. In the drawings, the grid shown in each of the matrices indicates the positions in which ink drops are deposited. The blanks on the matrices means that those positions are without any ink drops. The matrix for a signal picture element is chosen to be a square with a side, for instance, 500 μm in length, and thus a single cell is a square with a side approximately 167 μm in length.

At the density level "1", the respective dot matrices for each color are not deposited with ink drops, but at the density level "2", the respective dot matrices are deposited with a single ink dot having a diameter of, for instance, about 100 μm, in a single cell. As the result of this, the picture elements painted are at low optical density levels. On the other hand, since the respective dot matrices are, for instance, at the density level "32", filled with nine ink dots having a diameter of about 180 μm, the picture elements painted are at the highest optical density level.

Figure 8A:
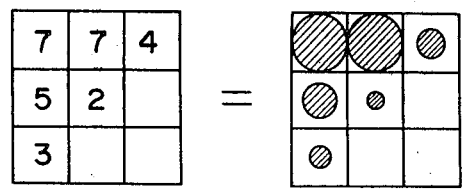
FIGS. 8A to 8C are illustrations showing the mutual relation between a dot matrix table and ink dots in a dot matrix associated therewith.
Figure 8B:
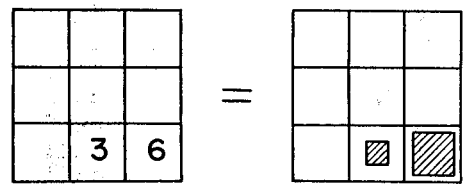
Figure 8C:
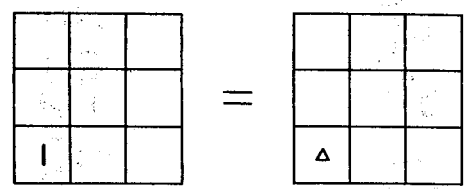

FIGS. 8A–8C show the relationship between a dot matrix table and ink dots in a matrix. In FIG. 8A the left side represents a dot matrix table for cyan at a density level "21" and the right side indicates the dot pattern and the size of round ink dots to be deposited. FIG. 8B is for magenta at a density level "7" and the ink dots to be deposited are square. FIG. 8C is for yellow at a density level "2" and the ink dots to be deposited are triangular. Squares and triangles are used to indicate different colors, for convenience, but all ink dots will in practice be round.

Figure 9:
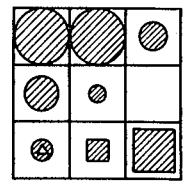
FIG. 9 is an illustration of a dot matrix for a picture element completed by combination of the dot matrices of FIGS. 8A to 8C.

FIG. 9 shows a completed dot matrix as a picture element wherein the dot patterns for the three colors shown in FIG. 8 are superimposed to paint a picture element with a complex color such as sky blue. As is apparent from the dot pattern, since only a single cell having two different color ink drops overlap, the mode of color mixture is by providing a mean-value color mixture which is quite similar to an additive color mixture in effect.

In the dot matrix tables shown in FIGS. 7A and 7B, the region of the dot patterns for cyan spreads out gradually from the upper left corner in the matrix as the density level increases; whilst the region of the dot patterns for magenta spreads out gradually from the lower right corner as the density level increases. With respect to the dot patterns for yellow, the region in which ink dots are to be deposited spreads from the lower left corner to the diagonally opposite corner in the matrix as the density level increases. Therefore, at low density levels or middle density levels, a dot matrix for one picture element comprising three dot matrices of different colors is composed of a small number of different color ink drops superimposed on one another by providing a mean-value color mixture. But the composing of a dot matrix at high density levels to be a subtractive color mixture because the large number of different color ink drops have to be superimposed on one another.

Although ink-jet heads of the conventional drop-on-demand type are used in the embodiment described hereinbefore, other types of ink-jet heads can be employed. Furthermore, a dot matrix having three cells on each of the rows and columns may be replaced by various dot matrices, for instance a dot matrix having four cells in each of the rows and columns, as desired. When using an additional colored ink such as the color of the skin, the additional ink drops should be distributed in blank cells from the remaining corner toward the opposite corner along a diagonal line in the matrix so as to overlap different color ink drops.

As many apparently widely different embodiments of this invention may be made without departing from the spirit and scope thereof, it is to be understood that the invention is not limited to the specific embodiments thereof except as defined in the appended claims.

What is claimed is:

1. A method for representing a complex color wherein a plurality of different color ink drops are deposited on a dot matrix, said method comprising:
   providing a mean-value color mixture of a complex color to be represented in low and middle density so as to deposit at least two kinds of different color ink drops on a dot matrix in such a way as to permit a single ink drop to be disposed in each of the greater part of the cells of the dot matrix; and
   applying a subtractive color mixture to a complex color to be represented in high density so as to deposit at least two kinds of different color ink drops on a dot matrix in such a way as to permit at least two kinds of ink drops to be superimposed in each of the greater part of the cells of the dot matrix.

2. A method as defined in claim 1, wherein said plurality of colors of ink are at least cyan, magenta and yellow.

3. A method as defined in claim 2, wherein said cyan ink drops and magenta ink drops are at first deposited on cells located at opposite corners of one diagonal line of said dot matrix, and subsequently progressively deposited on cells adjacent the first-mentioned said cells as the respective color density rises.

4. A method as defined in claim 3, wherein said yellow ink drops are at first deposited on a cell located at one corner on the other diagonal line of said dot matrix and subsequently progressively deposited on cells located along said other diagonal line as the color density rises.

5. A method as defined in claim 4, wherein said matrix for a single picture element comprises three cells on each of the rows and the columns.

6. A method as defined in claim 4, wherein the number of cells of a dot matrix on which ink drops are to be deposited and the size of dots to be deposited thereon vary directly as the densities of complex colors to be painted.

7. A method as defined in claim 6, wherein the size of dot to be deposited on a cell is from 100 $\mu$m to 180 $\mu$m in diameter.

8. A method as defined in claim 4, wherein said plurality of colors of inks further includes skin color ink, drops of which are at first deposited on a cell located at the opposite corner on said other diagonal line of said dot matrix and subsequently progessively deposited on cells located along said other diagonal line as the color density rises.

* * * * *